(12) United States Patent
Nimura et al.

(10) Patent No.: US 8,297,398 B2
(45) Date of Patent: Oct. 30, 2012

(54) TWO-WHEELED MOTOR VEHICLE

(75) Inventors: Taisuke Nimura, Wako (JP); Kenji Kofuji, Wako (JP); Kiyotaka Sakai, Wako (JP); Saiji Suzuta, Wako (JP); Toshiyuki Iwai, Wako (JP); Satoshi Kogo, Wako (JP); Eiji Toriyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 13/000,879

(22) PCT Filed: May 12, 2009

(86) PCT No.: PCT/JP2009/058815
§ 371 (c)(1),
(2), (4) Date: Dec. 22, 2010

(87) PCT Pub. No.: WO2010/018701
PCT Pub. Date: Feb. 18, 2010

(65) Prior Publication Data
US 2011/0108346 A1 May 12, 2011

(30) Foreign Application Priority Data

Aug. 11, 2008 (JP) .................................. 2008-207286
Aug. 11, 2008 (JP) .................................. 2008-207301

(51) Int. Cl.
*B62M 17/00* (2006.01)
(52) U.S. Cl. ....................................................... 180/226
(58) Field of Classification Search .................... 180/226
See application file for complete search history.

(56) References Cited

U.S. PATENT DOCUMENTS

| 4,607,718 A * | 8/1986 | Nagataki et al. | 180/226 |
| 7,510,040 B2 * | 3/2009 | Takayanagi et al. | 180/226 |
| 7,644,797 B2 * | 1/2010 | Kofuji | 180/227 |
| 7,810,603 B2 * | 10/2010 | Kofuji et al. | 180/358 |
| 7,913,793 B2 * | 3/2011 | Kofuji | 180/226 |
| 7,971,674 B2 * | 7/2011 | Nimura et al. | 180/226 |
| 8,002,068 B2 * | 8/2011 | Nimura et al. | 180/226 |
| 2004/0140141 A1 | 7/2004 | Soatti | |
| 2007/0095591 A1 | 5/2007 | Takayanagi et al. | |
| 2008/0156571 A1 | 7/2008 | Kofuji et al. | |

FOREIGN PATENT DOCUMENTS

| JP | 2002087364 A * | 3/2002 |
| JP | 2005-524569 A | 8/2005 |
| JP | 2007-091123 A | 4/2007 |
| JP | 2008087540 A * | 4/2008 |
| JP | 2008-162502 A | 7/2008 |
| WO | 03/093096 A1 | 11/2003 |

OTHER PUBLICATIONS

International Search Report of PCT/JP2009/058815, mailing date Aug. 11, 2009.

* cited by examiner

*Primary Examiner* — Lesley D Morris
*Assistant Examiner* — Daniel Yeagley
(74) *Attorney, Agent, or Firm* — Westerman, Hattori, Daniels & Adrian, LLP (57) ABSTRACT

A two-wheeled motor vehicle provided with a drive shaft (32) rotatably supported by a swing arm (28) rockable on a pivot shaft (27). The longitudinal center axis (32J) of the drive shaft (32) is located below a line (28C) interconnecting the pivot shaft (27) and an axle (40). The drive shaft (32) is surrounded by the swing arm (28).

2 Claims, 9 Drawing Sheets

TWO-WHEELED MOTOR VEHICLE

BACKGROUND OF THE INVENTION

1. Technical Field

The present invention relates to a two-wheeled motor vehicle provided with a drive shaft.

2. Background Art

There have been known two-wheeled motor vehicles provided with a drive shaft for transmitting drive force from an engine to a rear wheel (see, for example, Patent Literature 1)

According to the disclosure of Patent Literature 1, the drive shaft is disposed underneath a pivot shaft and rear swing arm. With such an arrangement, the rear swing arm can be fastened from its opposite lateral sides with a sufficient length of the pivot shaft secured, and thus, it is possible to readily secure a sufficient fastening rigidity of the pivot shaft.

However, with the technique disclosed in Patent Literature 1, the body of the rear swing arm would have a reduced vertical width in some part thereof, and thus, there would occur limitations to securing the rigidity so that it tends to be difficult to secure a predetermined rigidity. Further, because part of the drive shaft is exposed outwardly, there is a room to improve the outer appearance of the vehicle.

Prior Art Literature:

Patent Literature 1: Japanese Patent Application Laid-Open Publication No. 2007-91123

SUMMARY OF INVENTION

Technical Problem

It is therefore an object to provide a two-wheeled motor vehicle which can not only readily achieve a sufficient rigidity of the swing arm but also have an improved outer appearance.

Solution to Problem

According to the present invention, there is provided an two-wheeled motor vehicle, which comprises: a vehicle body frame; an engine fixed to the vehicle body frame; a pivot shaft provided on a rear portion of the vehicle body frame; a single swing arm extending rearward from the pivot shaft and swingably support a rear wheel; and a drive shaft disposed to extend between the engine and the rear wheel to transmit drive force from the engine to the rear wheel. The longitudinal central axis of the drive shaft is located below an imaginary line interconnecting the pivot shaft and an axle of the rear wheel, the single swing arm is disposed to surround the drive shaft, and the single swing arm has, in a front half region thereof, upper and lower spaces partitioned from each other by a partition member, and the drive shaft is disposed within the lower space.

Preferably, the swing arm has, in a front half region thereof, upper and lower spaces partitioned from each other by a partition member, and the drive shaft is disposed within the lower space.

Preferably, the swing arm has a recessed portion formed underneath the front end thereof, the recessed portion is covered with a cover member, and a front portion of the drive shaft is covered with the cover member.

Advantageous Effects of Invention

According to the present invention, the longitudinal central axis of the drive shaft is located below an imaginary line interconnecting the pivot shaft and the axle of the rear wheel, and the single swing arm is disposed to surround the drive shaft. Because the pivot shaft is fastened from its opposite sides with its sufficient length secured in the aforementioned manner, the present invention can not only achieve an enhanced rigidity of the swing arm while readily securing the fastening rigidity of the pivot shaft and sufficient vertical width of the swing arm, but also achieve an improved outer appearance by allowing the drive shaft to not be exposed outwardly.

Further, because the partition member is provided in the front half region of the swing arm, the present invention can enhance the rigidity of portions of the swing arm at and around the pivot shaft. In addition, the torsion center of the swing arm can be located very close to the pivot shaft in the height direction of the vehicle, so that weight increase of the swing arm can be minimized and thus an appropriate torsional characteristic can be achieved.

Furthermore, in the present invention, the swing arm has the recessed portion underneath its front end so that it has a reduced rigidity in a portion thereof located underneath the pivot shaft. Thus, the torsion center of the swing arm can be located even closer to the pivot shaft in the height direction of the vehicle. In this case, the recessed portion is covered with the cover member that also covers the front portion of the drive shaft. Thus, the drive shaft is not exposed outwardly, which can thereby prevent degradation of the outer appearance of the vehicle.

DETAILED DESCRIPTION OF THE INVENTION

Now, a description will be given about preferred embodiments of the present invention, with reference to the accompanying drawings.

Figure 1:
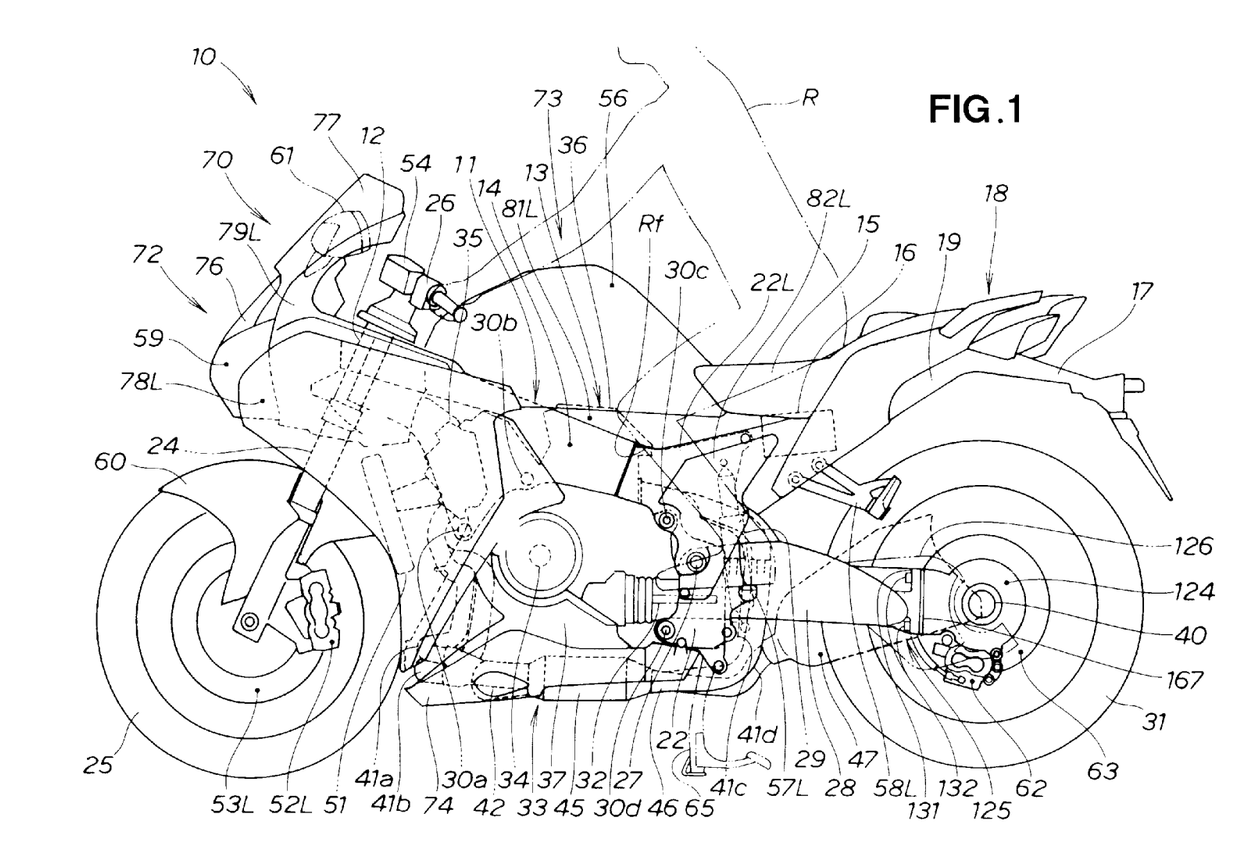
FIG. 1 is a side elevational view of a two-wheeled motor vehicle according to an embodiment of the present invention.

Referring first to FIG. 1, a two-wheeled motor vehicle of the present invention 10 includes a vehicle body frame 11. The vehicle body frame 11 includes: a head pipe 12; a main frame 14 extending rearward from the head pipe 12 to support an engine 13; and a rear frame 19 extending from an rear-end upper portion of the main frame 14 to support not only a driver's seat 15 but also a vehicle body rear section 18 having electric components, such as a battery 16, mounted thereon and including a rear fender 17. The main frame 14 includes a pivot plates 22 provided on a rear end portion of the main frame 14 to support a swing arm 28.

A pivot shaft 27 is fitted in the pivot plates 22. The rear swing arm 28 (swing arm 28) extends rearward from the pivot shaft 27. A shock-absorbing rear cushion unit 29 is disposed between the swing arm 28 and the main frame 14. A rear wheel 31 is mounted to a distal end portion of the swing arm 28. The rear wheel 31 is driven via a drive shaft 32 interconnecting the engine 13 and the rear wheel 31.

A front fork 24 is provided on the head pipe 12, a front wheel 25 is attached to a lower end portion of the front fork 24, and a steering handle 26 for steering the front wheel 25 is attached to an upper end portion of the front fork 24.

The engine 13 is a V-type four-cylinder engine, which is supported by the main frame 14 via first to support members 30a to 30d. The support members 30a to 30d are each provided horizontally in a width direction of the two-wheeled motor vehicle and are arranged in the mentioned order in a front-to-rear direction of the vehicle. Of the support members 30a to 30d, the third and fourth support members 30c and 30d are fixed to the pivot plates 22. Namely, the engine 13 is fixed to the main frame 14 and pivot plates 22.

The V-type four-cylinder engine 13 has front cylinders 35 extending obliquely forward and upward from a crankshaft 34 provided within a crankcase 37 and rear cylinders 36 extending obliquely rearward and upward from the crankshaft 34. In the V-type four-cylinder engine 13, as viewed from a lateral side of the vehicle, the main frame 14 overlaps the front and rear cylinders 35 and 36 constituting an upper portion of the engine 13, and part of the pivot plates 22 overlaps the crankcase 37 constituting a lower portion of the engine 13.

The V-type four-cylinder engine 13 includes an exhaust device 33. The exhaust device 33 includes: exhaust pipes 41a to 41d extending from the respective cylinders 35 and 36; a catalyst tube 45 into which the exhaust pipes 41a to 41d merge and which purifies exhaust gas from the exhaust pipes 41a to 41d; a collecting tube 46 extending from the catalyst tube 45; and a silencer 47 connected to the collecting tube 46.

In FIG. 1, reference numeral 51 indicates a radiator unit, 52L and 52R (only one of them 52L closer to a reader of the figure is shown) indicate front disk brake calipers provided on the front fork, 53L and 53R (only one of them 53L closer to the reader of the figure is shown) indicate front disk plates provided on the front wheel 25 and sandwiched by the front disk brake calipers 52L and 52R, 54 indicates a front master cylinder provided on the steering handle 26, 56 indicates a fuel tank cover covering a fuel tank fixed to the main frame 14 and functioning also as a later-described cowl section 70, 57L and 57R (only one of them 57L closer to the reader of the figure is shown) indicate driver's steps, 58L and 58R (only one of them 58L closer to the reader of the figure is shown) indicate pillion passenger's steps fixed to the rear frame 19, 60 indicates a front fender, 61L and 61R (only one of them 61L closer to the reader of the figure is shown) indicate mirrors, 62 indicates a rear disk brake caliper, 63 indicates a rear disk plate provided on the rear wheel 31 and sandwiched by the rear disk brake caliper, and 65 indicates a main stand.

The following describe the cowl section 70 that primarily constitutes an outer appearance of the two-wheeled motor vehicle 10.

The cowl section 70 includes a front cowl section 72 extending from the head pipe 12 and covering a front portion of the vehicle body frame 11 via a cowl stay, a side cowl section 73 provided continuously with the front cowl portion 72 to cover sides of the vehicle, and a lower cowl section 74 provided under the engine 13. The cowl section 70 functions as a wind guard and also functions to enhance the outer appearance of the vehicle.

The front cowl section 72 includes: an upper center cowl 76 covering an upper portion of a headlight 59; a wind screen 77 extending above the upper center cowl 76; and part of front upper side cowls 79L and 79R (only one of them 79L closer to the reader of the figure is shown) to which are mounted middle cowls 78L and 78R (only one of them 78L closer to the reader of the figure is shown) covering sides of the main frame 14 and which support left and right regions of the wind screen 77.

The side cowl section 73 includes: the front upper side cowls 79L and 79R supporting the left and right regions of the wind screen 77; the middle cowls 78L and 78R covering sides of the head pipe 12 and main frame 14; knee covers 81L and 81R (only one of them 81L closer to the reader of the figure is shown) covering a lower portion of the fuel tank cover 56 and designed to be sandwiched by legs Rf of the driver R; and pivot plate covers 82L and 82R provided below the knee covers 81L and 81R and covering outer side surfaces of the pivot plates 22L and 22R (only one of them 22L closer to the reader of the figure is shown) that are constituent components of the main frame 14.

The following further describe a rear structure of the two-wheeled motor vehicle. The swing arm 28 is pivotably or swingably supported by the pivot plate 22 via the pivot shaft 27, and a gearbox 124, having a rear wheel axle 40 mounted therein, and a fastening section 125 fastening the gearbox 124 to the swing arm 28, are mounted to a rear end portion of the swing arm 28. A gearbox cover 126 covering an outer surface portion from a lateral side is mounted to the fastening section 125.

The fastening section 125 includes a flange portion 131 provided adjacent to the swing arm 28, and a plurality of fastener members 132 screwed from the swing arm 28, through the flange portion 131, into the gearbox 124 to thereby fix together the swing arm 28 and the gearbox 124. The drive shaft 32 is disposed within the swing arm 28.

Figure 2:
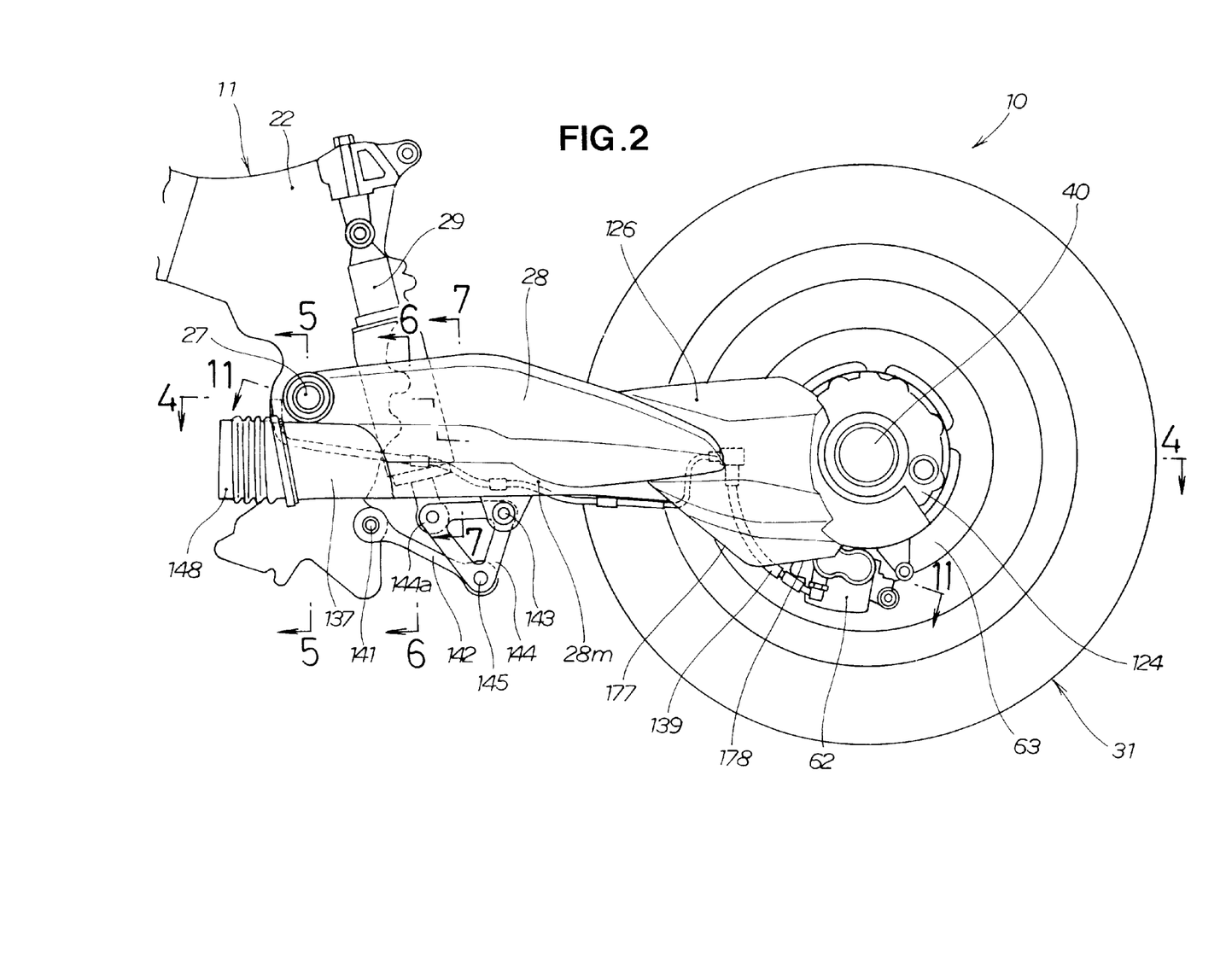
FIG. 2 is an enlarged view of a rear section of the two-wheeled motor vehicle of FIG. 1.
Figure 3:
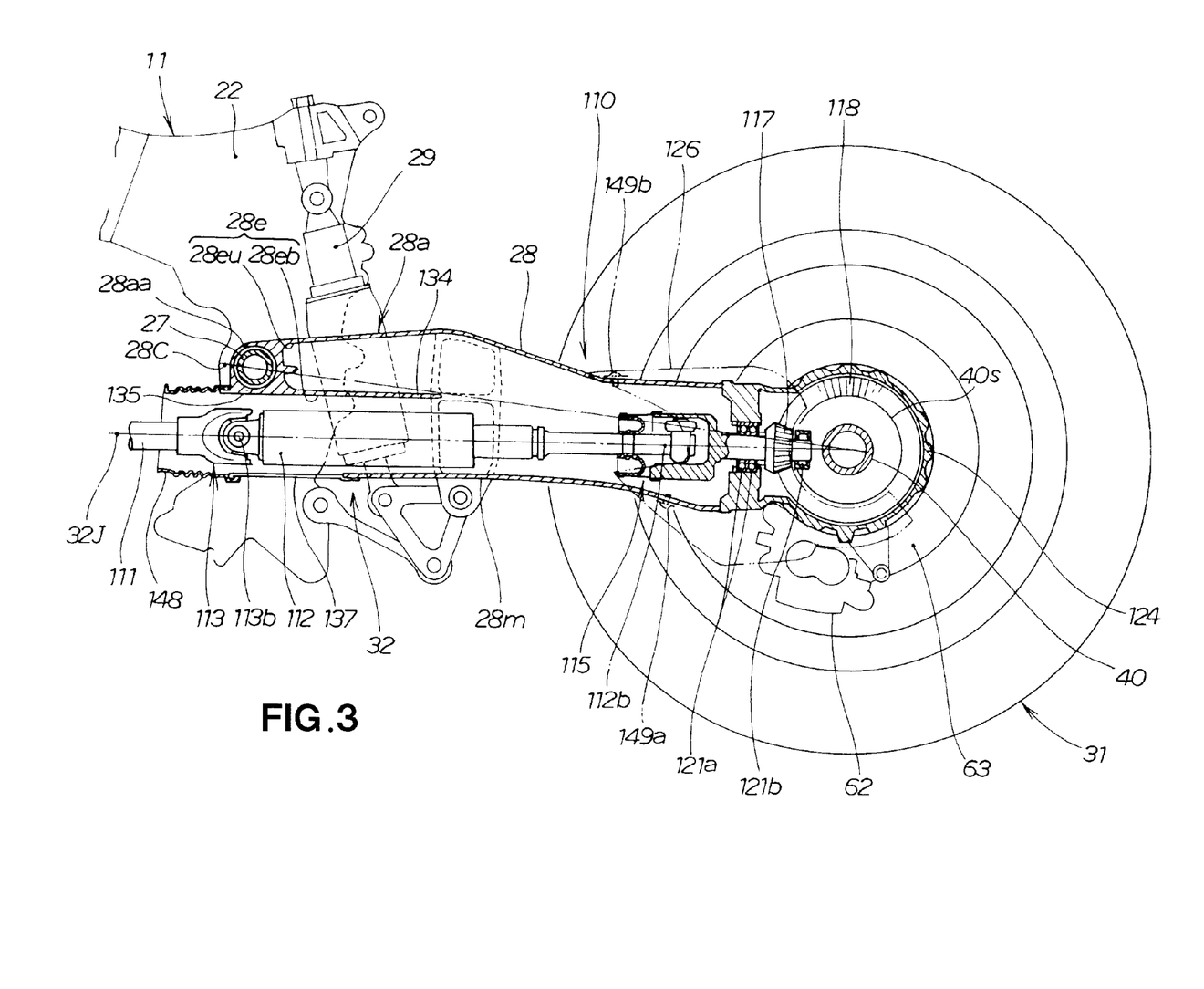
FIG. 3 is a sectional view of a swing arm of FIG. 2.

As shown in FIGS. 2 and 3, the two-wheeled motor vehicle 10 includes: the pivot shaft 27 fitted in the pivot plate 22; the swing arm 28 pivotably or swingably mounted on the pivot shaft 27; the rear wheel 31 rotatably supported on a rear portion of the swing arm 28 via the rear wheel axle 40; and a rear cushion (rear cushion unit) 29 disposed between the swing arm 28 and the vehicle body frame 11.

A rear wheel drive mechanism 110 includes: a universal joint 113 connected to a first drive shaft 111, functioning as an output shaft of the engine 13 (FIG. 1), to transmit drive force from the engine 13; a second drive shaft 112 connected to a rear end portion 113b of the universal joint 113 to transmit the drive force from the engine 13; an axial length adjustment mechanism 115 connected to a rear end portion 112b of the second drive shaft 112 for permitting adjustment of the axial length of the second drive shaft 112; driving and driven gears 117 and 118 connected to the axial length change mechanism 115 for changing the direction of the drive force to transmit the drive force to the rear wheel axle 40; and bearing sections 121a and 121b supporting the driving gear 117.

Whereas the axial length change mechanism 115 in the instant embodiment employs a tripod-type joint, it is not so limited in construction and may employ any other joint, such as a ball spline slide joint or cross groove joint, as long as the joint has a sliding function.

Namely, in the instant embodiment where the drive shaft 32 comprises a combination of the first and second drive shafts 111 and 112 connected to front and rear end portions of the universal joint 113, the two-wheeled motor vehicle 10 includes the swing arm 28 swingably provided on the vehicle body frame 11 via the pivot shaft 27, and the rear wheel 31 that is a driving wheel swingably supported by the swing arm 28 and rotatable by the drive shaft 32 for transmitting the drive force of the engine 13. The drive force from the engine 13 is transmitted to the rear wheel 31 via the drive shaft 32 and universal joint 113.

As viewed in side elevation of the vehicle body, the central axis 32J of the drive shaft 32 is located underneath an imaginary line 28C connecting the pivot shaft 27 and the axle 40 of the rear wheel 31, and the line 28C connecting the pivot shaft 27 and the axle 40 of the rear wheel 31 extends through the interior of the swing arm 28 in the front-rear direction of the vehicle. The swing arm 28 is disposed to surround the drive shaft 32. The swing arm 28 has a hollow section 28e, a front half region 28a of the hollow section 28e has an upper space 28eu and lower space 28eb partitioned from each other by a partition member 134, and the drive shaft 32 is disposed in the lower space 28eb.

The partition member 134 disposed in the front half region 28a can enhance rigidity of portions of the swing arm 28 at and around the pivot shaft 27. In addition, a torsion center of the swing arm 28 can be located very close to the pivot shaft 27 in a height direction of the vehicle. With the torsion center of the swing arm 28 located very close to the pivot shaft 27, behavioral characteristics of the rear wheel 31 during cornering of the vehicle can be approximated to those in the conventionally-known two-wheeled motor vehicles. Thus, during cornering travel of the vehicle, it is possible to maintain appropriate operability of the vehicle.

The swing arm 28 further has a recessed portion 135 formed underneath the front end 28aa thereof, and the recessed portion 135 is closed with a resin-made cover member 137 so that a front portion of the drive shaft 32 is covered with the cover member 137. Because the cover member 137 is made of resin, the swing arm 28 can be reduced in weight.

To a rear end portion of the swing arm 28 is connected a gearbox 124 accommodating the rear wheel axle 40 and drive-related components around the rear wheel axle 40. In addition, a brake hose 139 connected to the rear brake caliper 62 (rear disk brake caliper 62) is covered with the gearbox cover 126. Because the brake hose 139 is covered with the gearbox cover 126 so as not to be visible from a lateral side of the vehicle, it is possible to even further enhance the outer appearance at and around the rear brake caliper 62.

To the swing arm 28 are operatively connected: a first arm member 142 extending rearward from the vehicle body frame 11 via a first pivot shaft 141 and pivotably mounted on the first pivot shaft 141; a second arm member 144 having a substantially triangular shape as viewed in side elevation, extending forward from a middle portion 28m of the swing arm 28 via a second pivot shaft 143 and pivotably mounted on the second pivot shaft 143; the rear cushion 29 disposed between the front end 144a of the second arm member 144 and the vehicle body frame 11; and a third pivot shaft 145 pivotably mounting a distal end portion of the first arm member 142 to a middle portion of the second arm member 144, so that vibration etc. acting on the swing arm 28 can be absorbed. Reference numeral 148 indicates a boot, and 149a and 149b indicate bolts fastening the gearbox cover 126 to the swing arm 28.

The swing arm 28 is recessed underneath the front end 28aa so that the swing arm 28 has a reduced rigidity underneath the pivot shaft. With the rigidity of the swing arm 28 reduced underneath the pivot shaft, the torsional center of the swing arm 28 can be located even closer to the pivot shaft 27 in the height direction, and thus, an appropriate torsional characteristic can be set.

The brake hose 139 connected to the rear brake caliper 62 is covered with the gearbox cover 126. Because the brake hose 139 is invisible from outside by being covered with the gearbox cover 126, the outer appearance at and around the rear brake caliper 62 can be enhanced even further.

Figure 4:
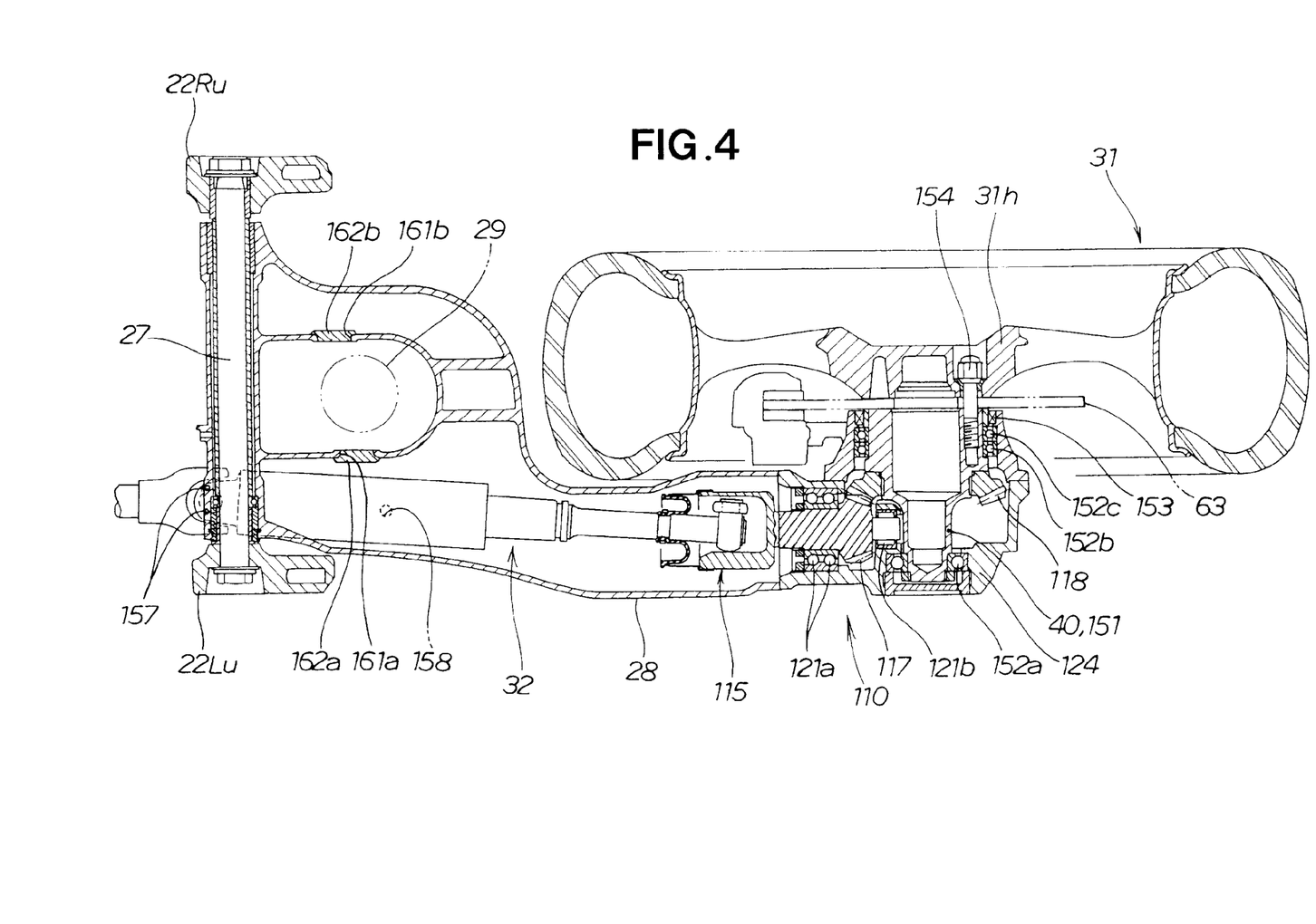
FIG. 4 is a sectional view taken along line 4-4 of FIG. 2.

As shown in FIG. 4, the rear wheel drive mechanism 110 including the drive shaft 32 is accommodated in the swing arm 28 and gearbox 124 connected to the rear end of the swing arm 28. The swing 28 is a member extending leftward of the rear wheel 31 and supports the rear wheel 31 in a cantilevered fashion.

A sleeve 151 as the rear wheel axle 40 for supporting the driven gear 118 in the gearbox 124 is rotatably provided in the rear wheel drive mechanism 110, and the rear disk plate 63 and a rear wheel hub 31h included in the rear wheel 31 are integrally mounted on the sleeve 151.

With the above-described structural arrangements, the drive force applied to the driven gear 118 is transmitted to the sleeve 151, rear wheel hub 31h and drive the rear wheel 31 in the order mentioned.

In the above-described embodiment, the swing arm 28, drive shaft 32 and rear wheel drive mechanism 110 are located to the left of the rear wheel 31. Alternatively, however, the swing arm 28, drive shaft 32 and rear wheel drive mechanism 110 may be located to the left of the rear wheel 31.

Further, in the figure, reference numerals 152a to 152c indicate bearings supporting the rear wheel axle 40, 153 indicates a sealing member, 154 indicates a fastening bolt, 157 indicates fastening holes formed in a front portion of the swing arm 28 for fastening a front portion of the cover member 137, 158 indicates a fastening hole portion formed in a middle portion of the swing arm 28 for fastening a rear portion of the cover member 137, 161a and 161b indicate cast holes, and 162a and 162b indicate caps closing the cast holes 161a and 161b.

Figure 5:
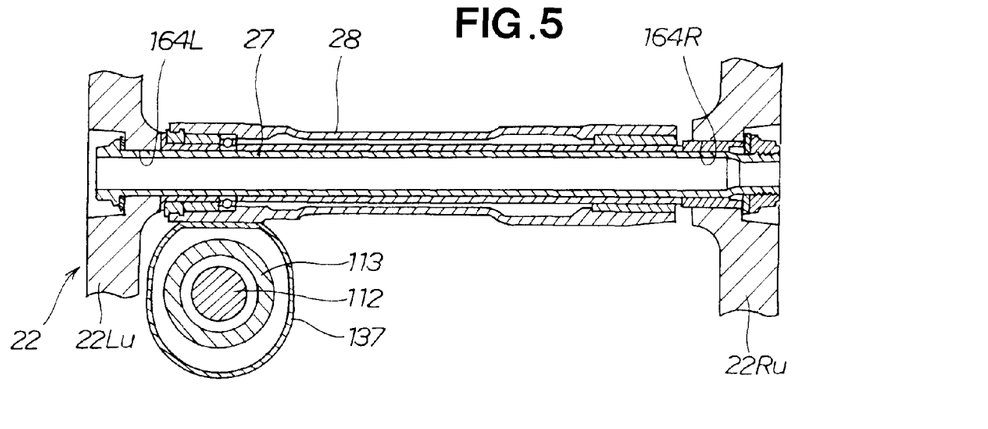
FIG. 5 is a sectional view taken along line 5-5 of FIG. 2.

As shown in FIG. 5, the pivot plate 22 has left and right vertically-projecting portions 22Lu and 22Ru, and pivot holes 164L and 164R are formed in the vertically-projecting portions 22Lu and 22Ru, respectively. The pivot shaft 27 extends between the pivot holes 164L and 164R. The swing arm 28 is pivotably mounted on the pivot shaft 27.

As shown in FIG. 5 in conjunction with FIG. 3, the swing arm 28 is recessed in a portion thereof underneath the front end 28aa, and the resultant recessed portion 135 is covered with the cylindrical cover member 137 so that the first drive shaft 112 is partially covered with the cover member 137.

Because the swing arm 28 is recessed underneath the front end 28aa as above, the swing arm 28 has a reduced rigidity underneath the pivot shaft 27. With the rigidity of the swing arm 28 reduced underneath the pivot shaft 27, the torsion center of the swing arm 28 can be located even closer to the pivot shaft 27 in the height direction.

Figure 6:
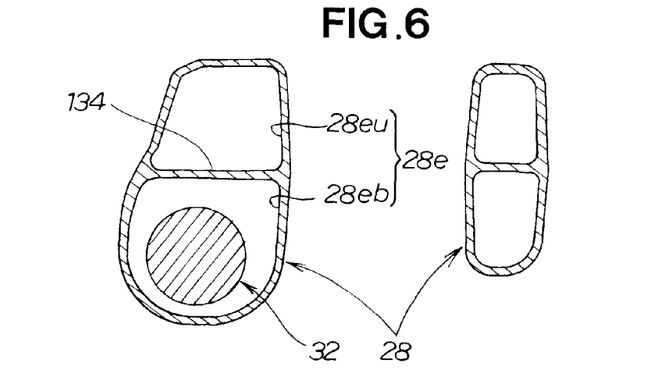
FIG. 6 is a sectional view taken along line 6-6 of FIG. 2.

As shown in FIG. 6, the swing arm 28 has the hollow section 28e, the upper space 28eu and lower space 28eb partitioned from each other by the partition member 134 in its front portion, and the drive shaft 32 is disposed in the lower space 28eb.

As shown in FIG. 6 in conjunction with FIG. 3, the partition member 134 disposed in the front region 28a can enhance the rigidity of portions of the swing arm 28 at and around the pivot shaft 27. In addition, the torsion center of the swing arm 28 can be located very close to the pivot shaft 27 in the height direction of the vehicle, so that weight increase of the swing arm 28 can be minimized and thus an appropriate torsional characteristic can be achieved.

Figure 7:
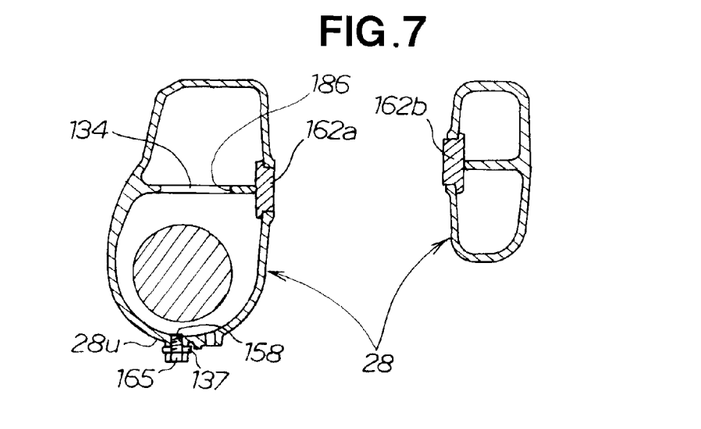
FIG. 7 is a sectional view taken along line 7-7 of FIG. 2.

As seen in FIGS. 6 and 7, a hole 186 for passage therethrough of a circular column, functioning as a connection member for interconnecting upper and lower sand molds, is formed between the upper space 28eu and the lower space 28eb, constituting the hollow section 28e of the swing arm 28, during casting of the swing arm 28. Reference numeral 165 indicates a fastening bolt that fastens the cover member 137 to the fastening hole portion 158 formed in the underside 28u of the swing arm 28.

Figure 8:
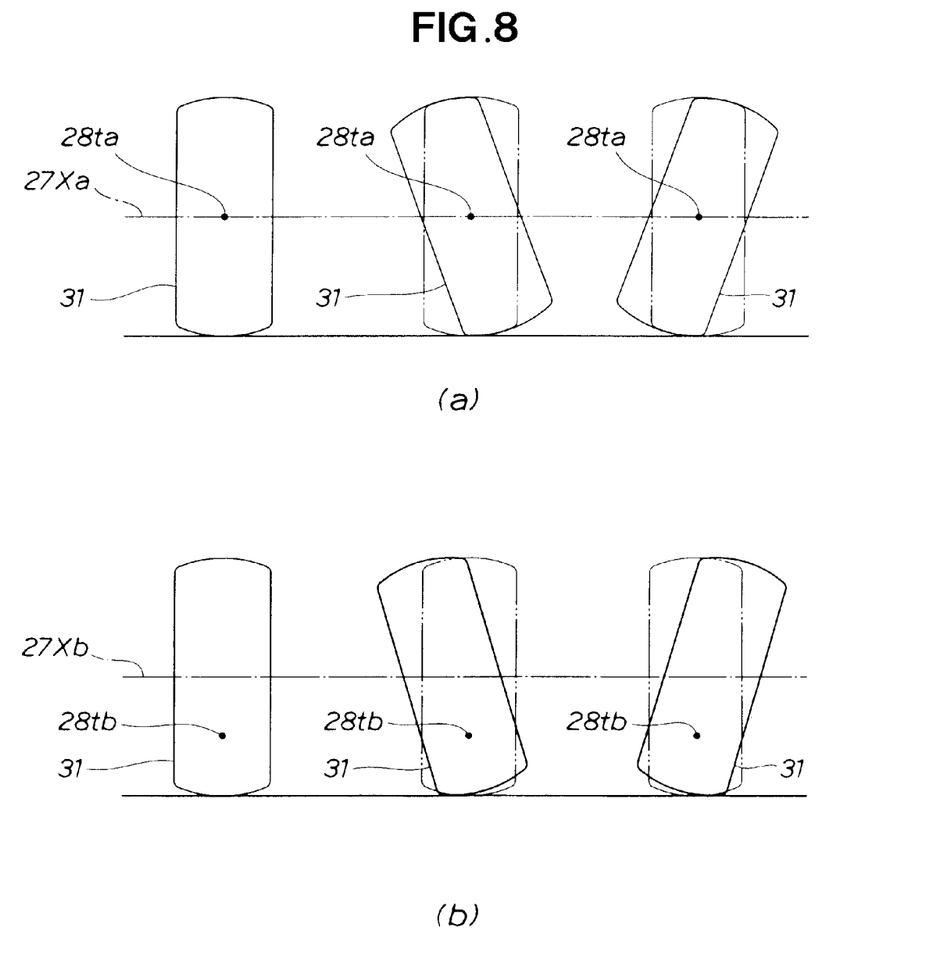
FIGS. 8(a) and 8(b) are views showing that a cornering characteristic changes depending on a position of a torsional center of the swing arm relative to a position of a pivot shaft.

With reference to FIG. 8, the following describe that the torsional characteristic differs due to positional relationship between the height of the center line of the pivot shaft and the height of the torsional center of the swing arm.

(a) of FIG. 8 shows a state where the height of the center line 27Xa of the pivot shaft 27 coincides with the height of the torsional center 28ta of the swing arm 28; in this case, the height of the torsional center 28ta of the swing arm 28 is located very close to the center line 27Xa. Where the position of the pivot shaft 27 and the position of the rear wheel axle also substantially coincides with each other, the rear wheel 31 would incline about the torsional center 28ta of the swing arm 28 during left or right cornering, as shown (a) of FIG. 8.

If, on the other hand, the torsional center 28tb of the swing arm 28 is located below the center line 27Xb of the pivot shaft 27, the rear wheel 31 would incline about the torsional center 28tb of the swing arm 28 spaced from the center line 27Xb of the pivot shaft 27, as shown in (b) of FIG. 8.

Because the torsional center 28tb of the swing arm 28 is spaced from the center line 27Xb of the pivot shaft 27 in the illustrated example shown in (b) of FIG. 8, the behavior of the rear wheel 31 during cornering would differ between the example shown in (a) of FIG. 8 and the example shown in (b) of FIG. 8. Namely, in order that the torsional characteristic of the swing arm may be maintained and thus appropriate operability may be maintained during cornering, it is desirable that the torsional center of the swing arm be as close to the pivot shaft as possible as shown in (a) of FIG. 8.

Referring again to FIG. 3, the torsional center 28tb of the swing arm 28 in the present invention is located extremely close to the pivot shaft 27. Thus, appropriate operability can be maintained during cornering travel.

Figure 9:
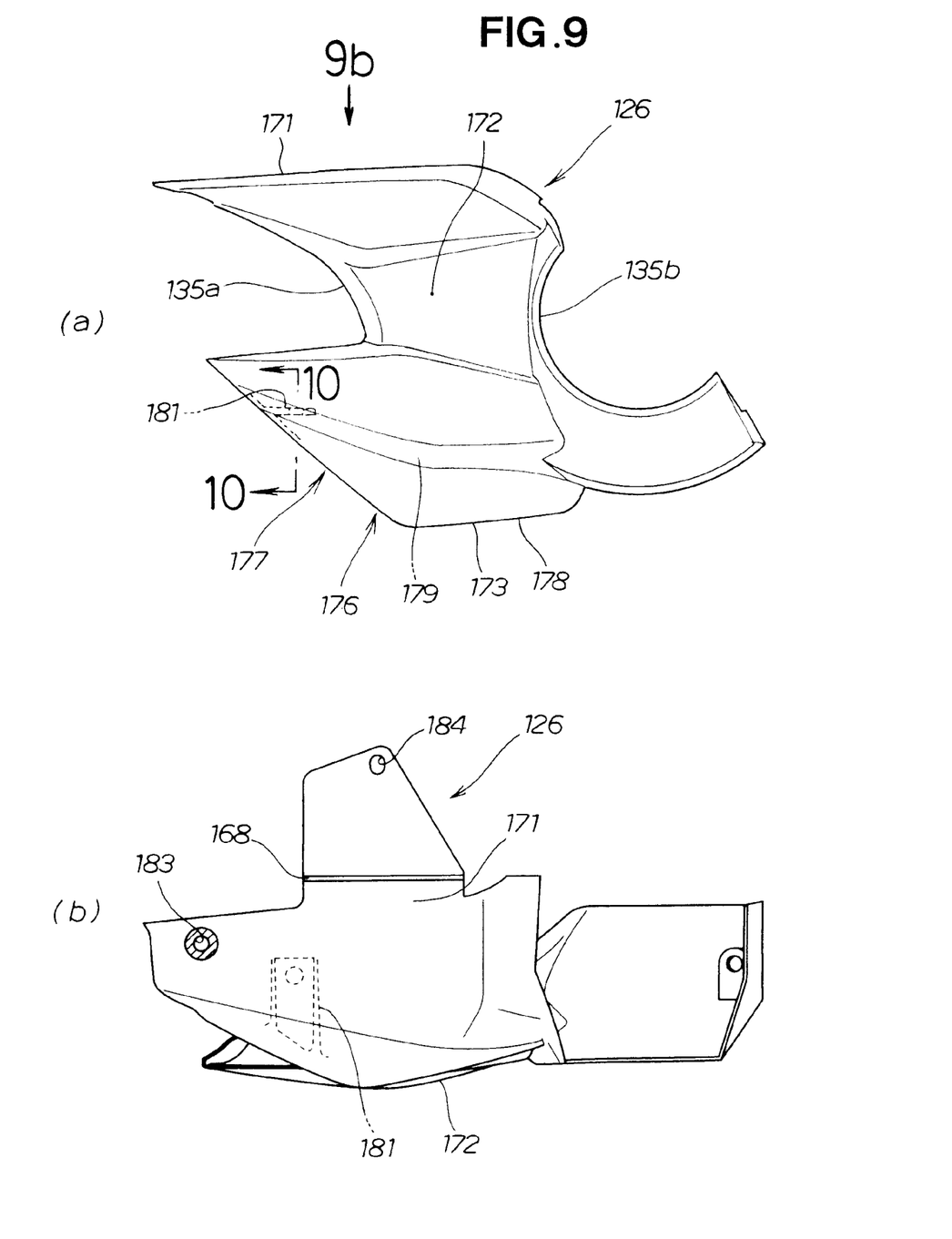
FIGS. 9(a) and 9(b) are views of a gear box cover of FIG. 2.
Figure 10:
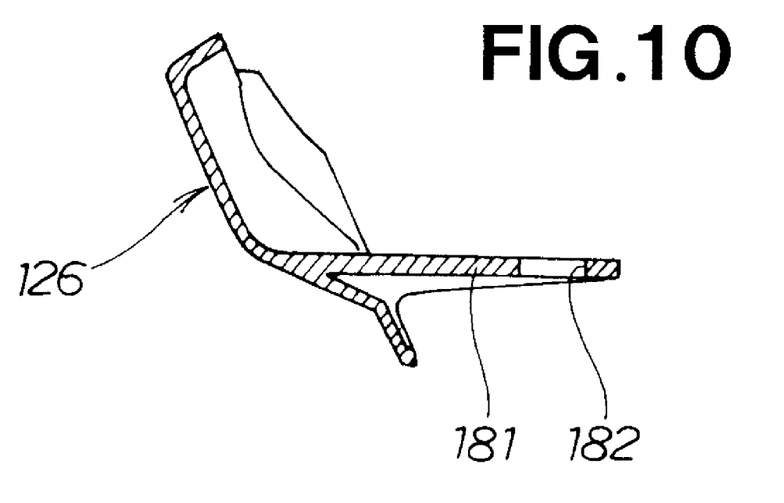
FIG. 10 is a sectional view taken along line 10-10 of FIG. 9(a)

The following describe a construction of the gearbox cover 126, with reference to FIGS. 9 and 10.

The gearbox cover 126 is formed in conformity with contours of the swing arm 28 (FIG. 1) and gearbox 124 (FIG. 1), and it covers portions at and around a joint section 167 (1) between the two components 28 and 124. The gearbox cover 126 includes an upper surface section 171 covering upper surfaces of the joint section 167 etc., a side surface section 172 covering side surfaces of the joint section 167 etc., and a lower surface section 173 covering lower surfaces of the joint section 167 etc. The side surface section 172 includes a front recessed portion 135a engaging with the outer surface of the swing arm 28, and a rear recessed portion 135b engaging with an outer circumferential surface portion 40s (FIG. 3) of the rear wheel axle 40. A resin-made grooved hinge portion 168 for permitting opening/closing of the gearbox cover 126 is provided on the upper surface section 171.

A wind intake portion 177 is provided underneath the front recessed portion 135a for taking traveling wind (i.e., travel wind produced as the vehicle travels) into inside the gearbox cover 126, a wind output portion 178 as a wind outlet is provided at the rear lower end of the wind intake portion 177, and the rear brake caliper 62 (FIG. 2) is provided in opposed relation to the output portion 178. Namely, the rear brake caliper 62 is disposed around a lower end portion of the gearbox 124, and a wind directing section 176 is provided in a lower portion of the gearbox cover 126.

The rear brake caliper 62 is provided around the gearbox 124 (FIG. 2). The wind directing section 176 is provided on the gearbox cover 126, and it includes the wind intake portion 177 for taking in wind from the front of the vehicle, a guide portion 179 extending rearwardly of the wind intake portion 177 for directing rearward the wind taken in via the wind intake portion 177, and the wind output portion 178 provided rearwardly of the guide portion 179 in such a manner as to partly overlap the rear brake caliper 62 as viewed in side elevation of the vehicle for outputting the directed wind.

The wind intake portion 177, constituting the front end of the side surface section 172, has a gearbox cover mounting rib 181 extending inward for mounting the gearbox cover 126 to the underside of the swing arm 28, and a lower mounting hole 182 is formed in the gearbox cover mounting rib 181, as shown in FIG. 10.

An upper mounting hole 183 for mounting the gearbox cover 126 to the underside 28u of the swing arm 28 is formed in an upper surface portion 171. The gearbox cover 126 is securely fixed to the swing arm 28 using the upper and lower mounting holes 183 and 182.

The gearbox cover mounting rib 181 for mounting the gearbox cover 126 to the swing arm 28 extends inwardly of the gearbox cover 126. Namely, the rib 181 has a function for mounting to the gearbox 124. Because the gearbox cover mounting rib 181 has a function for reinforcing the gearbox cover 126 in addition to the above-mentioned mounting function, it is possible to increase the rigidity of the gearbox cover 126. The increased rigidity of the gearbox cover 126 can prevent the wind directing section 176 from vibrating and deforming due to wind pressure etc. If the gearbox cover 126 is made resistant to deformation etc. in the aforementioned manner, the wind intake portion 177 can be considerably increased in size.

Whereas the gearbox cover 126 is mounted to the swing arm 28 in the instant embodiment, the gearbox cover 126 may be mounted to the gearbox 124.

Further, another mounting hole 184 is formed in the inner surface of the resin-made grooved hinge portion 168 of the upper surface section 171, so that the gearbox cover 126 is fastened to a fixed side, including the gearbox 124, by means of a fastener member inserted through the mounting hole 184 positioned in alignment with stiller another hole formed in the fixed side.

Thus, after the fastener members are removed from the upper and lower mounting holes 183 and 182, the joint section 167 can be exposed by the side surface section 172 being pivoted upwardly about the grooved hinge portion 168, without the gearbox cover 126 being completely detached. Because the gearbox cover 126 is not completely detached, there is no possibility of the gearbox cover 126 being lost, and thus, maintenance of the vehicle can be facilitated.

Figure 11:
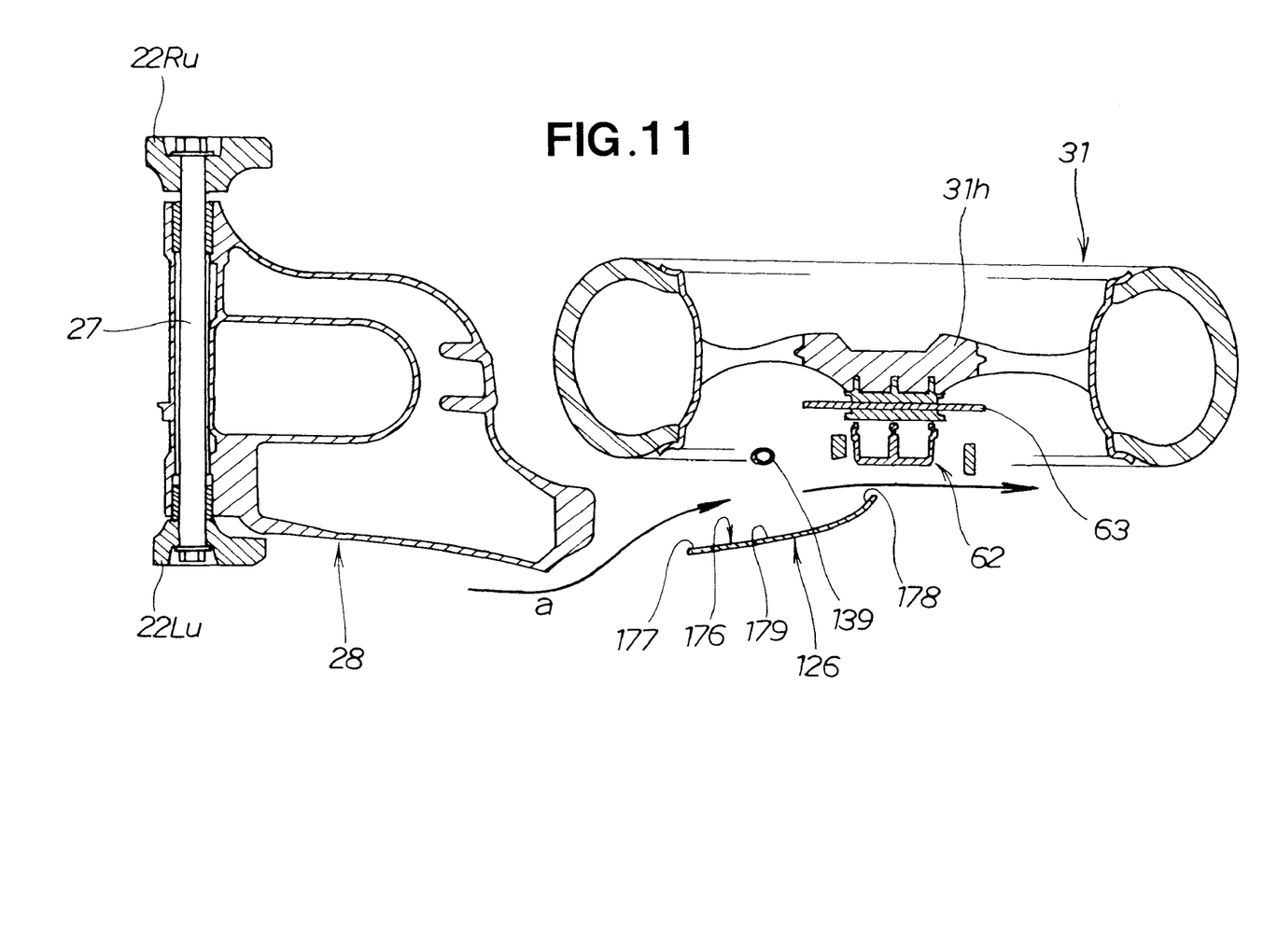
FIG. 11 is a sectional view taken along line 11-11 of FIG. 2, particularly showing wind flows.

As shown in FIG. 11, travel wind gets into the gearbox cover 126 through the wind intake portion 177 as indicated by arrow a. The wind taken in through the wind intake portion 177 is directed rearward along the guide portion 179 and then output via the wind output portion 178. With the gearbox cover 126 thus arranged, it is possible to not only enhance the outer appearance of the rear section of the vehicle but also effectively cool the rear brake caliper 62.

In the instant embodiment of the two-wheeled motor vehicle 10, as described above, the central axis 32J of the drive shaft is located below the imaginary line connecting the pivot shaft 27 and the axle 40 of the rear wheel as viewed from a lateral side of the vehicle, and the swing arm 28 is disposed to surround the drive shaft 32. Thus, the instant embodiment of the two-wheeled motor vehicle 10 can not only achieve an enhanced rigidity of the swing arm 28 while readily securing the fastening rigidity of the pivot shaft 27 and securing a sufficient vertical width of the swing arm 28, but also achieve an improved outer appearance by allowing the drive shaft 32 to not be exposed outwardly.

Whereas the embodiment has been described above as a two-wheeled motor vehicle, the basic principles of the present invention are also applicable to three-wheeled motor vehicles and other ordinary vehicles.

INDUSTRIAL APPLICABILITY

The basic principles of the present invention are well suited for application to two-wheeled motor vehicles provided with a drive shaft.

LEGEND

11 Vehicle Body Frame
13 Engine
27 Pivot Shaft
28 Swing Arm
28C Imaginary Line Connecting the Pivot Shaft and an Axle of a Rear Wheel
28a Front Half Region of the Swing Arm
28aa Front End of the Swing Arm
32 Drive Shaft
32J Central Axis of the Drive Shaft
134 Partition Member
135 Recessed Portion
137 Cover Member

The invention claimed is:

1. A two-wheeled motor vehicle comprising:
 a vehicle body frame;
 an engine fixed to the vehicle body frame;
 a pivot shaft provided on a rear portion of the vehicle body frame;
 a single swing arm extending rearward from the pivot shaft and swingably support a rear wheel; and
 a drive shaft disposed to extend between the engine and the rear wheel to transmit drive force from the engine to the rear wheel,
 wherein a longitudinal central axis of the drive shaft is located below an imaginary line interconnecting the pivot shaft and an axle of the rear wheel,
 the single swing arm is disposed to surround the drive shaft, and
 the single swing arm has, in a front half region thereof, upper and lower spaces partitioned from each other by a partition member, and the drive shaft is disposed within the lower space.

2. The two-wheeled motor vehicle according to claim 1, wherein the swing arm has a recessed portion formed underneath a front end thereof, the recessed portion is covered with a cover member, and a front portion of the drive shaft is covered with the cover member.

* * * * *